United States Patent [19]

Nordlund

[11] 4,453,114
[45] Jun. 5, 1984

[54] ELECTROMECHANICAL ACTUATOR COUNTER-EMF UTILIZATION SYSTEM

[75] Inventor: Lester H. Nordlund, Federal Way, Wash.

[73] Assignee: The Boeing Company, Seattle, Wash.

[21] Appl. No.: 454,587

[22] Filed: Dec. 30, 1982

[51] Int. Cl.³ .............................................. H02P 3/14
[52] U.S. Cl. .................................. 318/376; 318/138; 318/380; 318/430; 318/439; 318/492; 62/3
[58] Field of Search ............... 318/375, 376, 379, 380, 318/430, 492, 302, 434, 439, 138; 62/3, 243; 219/202; 244/58, 118.5

[56] References Cited

U.S. PATENT DOCUMENTS

| | | | |
|---|---|---|---|
| 1,751,424 | 3/1930 | Rosenthal | 310/53 |
| 2,377,027 | 12/1942 | Morgan et al. | 219/202 X |
| 2,733,770 | 1/1950 | Tourneau | 219/202 X |
| 2,959,018 | 5/1959 | Hwang | 62/3 |
| 3,152,271 | 10/1964 | Yamano et al. | 310/53 |
| 3,541,414 | 11/1970 | Wilkerson | 318/302 |
| 3,590,351 | 6/1971 | Littwin | 318/380 |
| 3,593,089 | 7/1971 | Appelo | 318/380 X |
| 3,890,551 | 6/1975 | Plunkett | 318/376 |
| 3,906,321 | 9/1975 | Salihi | 318/439 |
| 3,984,743 | 10/1976 | Horie | 318/375 |
| 4,027,220 | 5/1977 | Wilkerson | 318/376 |
| 4,136,305 | 1/1979 | Okumuya et al. | 318/375 X |
| 4,216,420 | 8/1980 | Jinbo et al. | 318/376 |
| 4,330,743 | 5/1982 | Glennon | 318/138 X |
| 4,362,023 | 12/1982 | Falco | 62/3 |

Primary Examiner—B. Dobeck
Assistant Examiner—Bentsu Ro
Attorney, Agent, or Firm—Christensen, O'Connor, Johnson & Kindness

[57] ABSTRACT

The counter-EMF generated by electromechanical actuators (14), (16), (18) and (20) during deceleration of the actuators is pooled to power various temperature control devices, such as Peltier-type thermoelectric modules (26) associated with the actuators themselves or a similar thermoelectric module (24) and a fan (30) used to cool an AC-to-DC power converter (10) situated at a location remote from the electromechanical actuators. An electronic commutator circuit (44) is operably coupled to windings (38), (40) and (42), of the actuators to energize the windings to operate the actuators as motors and terminate such energization of the windings to permit deceleration of the actuator whereby it operates as a generator. A rectifier circuit (51) is connected to each commutator circuit (44) to divert from the commutator circuit (44) the counter-EMF generated by windings (38), (40), and (42) during deceleration of the actuators and simultaneously collect the counter-EMF energy generated by the actuators during such decelerating for selected powering of the various temperature control devices.

16 Claims, 1 Drawing Figure

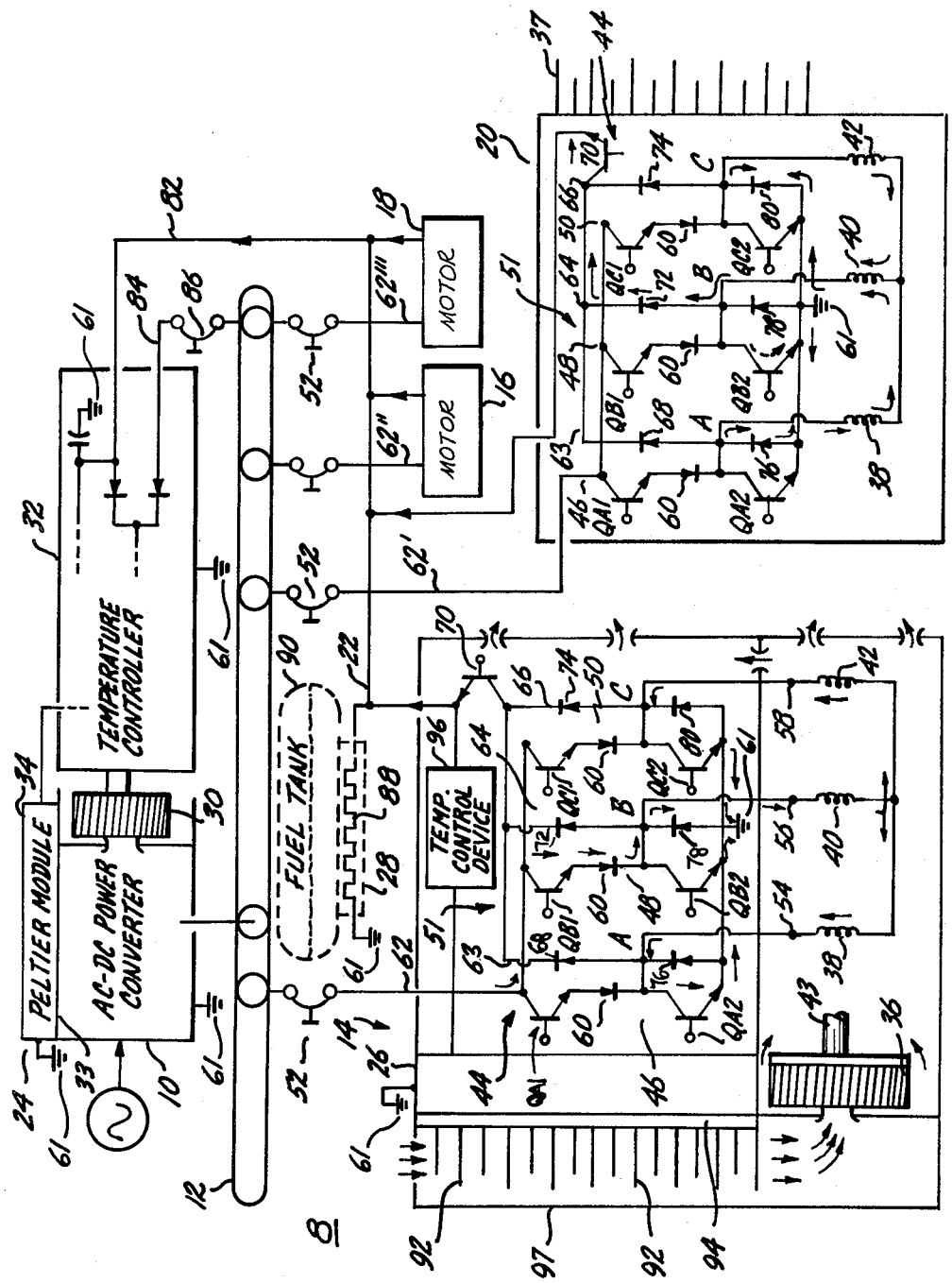

ELECTROMECHANICAL ACTUATOR COUNTER-EMF UTILIZATION SYSTEM

TECHNICAL FIELD

The present invention relates to electromechanical actuators, and more particularly to a system for isolating and employing the counter-electromotive force (hereinafter "EMF") generated during deceleration of an electromechanical actuator for useful purposes, such as to power temperature control devices located on the actuator itself or at remote locations.

BACKGROUND OF THE INVENTION

In many applications electric motors function as electromechanical actuators with duty cycles requiring rapid braking and then quick reversal of direction. Such duty cycles occur in the operation of rudders, deflectors, spoilers, ailerons, and other flight control surfaces on aircraft. A common manner of decelerating and reversing the direction of rotation of motors, as disclosed by U.S. Pat. No. 3,590,351, is by dynamic braking wherein a resistive load is placed across the motor windings to dissipate the counter-EMF energy generated by the motor as it decelerates. The resulting current produced from the counter-EMF voltage creates a magnetic field in opposition to armature rotation. Major drawbacks of this method of braking an electric motor are that not only is the energy of the counter-EMF wasted, large quantities of heat are generated in addition to the normal heat produced by the motor. Also, if the energy dissipating, resistive load is connected with the power supply system, undesirable high-level electrical transients may be imposed on the other electrical components also coupled to the power supply system.

Another known method of braking electric motors is by changing the energization of the armature windings and/or field of the motor, such as by reversing the direction of the current through the field windings, as disclosed by U.S. Pat. No. 3,541,414. In the '414 patent, the reduction of the field winding current is accomplished by routing the inductive energy of the field winding current back to the field power supply. This technique, however, requires a rather complicated electrical control circuit and also induces undesirable current transients in the power supply. Moreover, the level of the counter-EMF energy recovered by this technique is limited by the voltage level of the power supply.

As noted above, rapid deceleration and reversal of direction of electric motors produces high levels of heat that must be dissipated to prevent damage to the motor components. A common manner of dissipating the heat produced by electric motors is to use the mass of the motor itself and the surrounding structure as a heat sink. However, since many structural components of aircraft are now being constructed from high-strength, nonmetallic materials, such as graphite, boron and kevlar, other methods must be found for controlling the temperatures of motors.

Another common manner of dissipating the heat produced by electric motors is disclosed by U.S. Pat. No. 1,751,424 wherein a primary fan, driven by the output shaft of the motor, and an auxiliary fan, connected to the power supply itself, are employed to circulate air through the motor housing. In addition, in U.S. Pat. No. 3,152,271 Peltier-type thermoelectric devices are used to cool the ferrite permanent magnets that produce the motor field. The thermoelectric devices are powered by the same power supply used to operate the motor. Neither of these two patents involves the use of counter-EMF energy produced by a motor during deceleration to power cooling devices.

Thus, it is a principal object of the present invention to rapidly dynamically brake and reverse the direction of rotation of an electric motor without overheating the motor.

It is a particular object of this invention to divert and then employ the counter-EMF energy recovered from an electrical motor to operate temperature control devices within and remote from the motor.

It is also a particular object of the present invention to pool the counter-EMF energy recovered from a plurality of electric motors and utilize the energy source to cool particular power electronics and/or heat engine fuel as the need arises.

SUMMARY OF THE INVENTION

The foregoing and other objects are achieved in accordance with the present invention by diverting the counter-EMF generated deceleration energy of an electric actuator away from its input power supply system, recovering the counter-EMF energy and employing it to operate temperature control devices associated with the actuator itself and temperature control devices at other locations. In one aspect of the present invention, the actuator is in the form of an electric motor constructed with electronic commutator circuits that supply current to the motor windings in the proper direction and sequence and for the proper time period to operate the actuator as a motor. The commutator circuit includes power transistors interposed between the power supply and each motor winding. A firing circuit senses an angular position of the rotor to activate and deactivate the power transistors. When all of the power transistors are simultaneously deactivated, the commutator circuit is isolated from the input power supply.

The commutator circuit also includes a diode branch associated with each actuator winding to provide a path for flow of winding current under induced counter-EMF voltage produced during actuator deceleration, which path includes a low-voltage counter-EMF bus. In this mode of operation, the actuator functions as a generator. A counter-EMF control switch, in the form of a power transistor, is interposed between the commutator circuit and the counter-EMF bus to control the flow of current to the bus. By isolation of the commutator circuit from the input power bus when the actuator functions as a generator, the counter-EMF from the commutator circuit does not impose high-voltage transient signals on other electrical components connected to the bus.

In another aspect of the present invention, temperature control devices for cooling the commutator circuit components are powered by the counter-EMF energy produced by the actuator. Cooling is achieved through thermoelectric modules employing the Peltier effect to transmit heat from the commutator circuit to exterior fins on the actuator housing. The thermoelectric modules are connected to the counter-EMF bus through the intermediacy of a temperature switch to modulate the operation of the modules in accordance with the cooling needs of the actuator.

In an additional aspect of the present invention, a plurality of electromechanical actuators, in the form of electrical motors, are interconnected to a common counter-EMF bus. The counter-EMF energy generated by the motors is pooled by the bus for use to cool particular motors motors as required. An additional use for the pooled energy is to heat fuel contained in a tank situated at a location remote from the motors. Power from the counter-EMF bus is transmitted to resistance heating coils mounted on the exterior of the tank.

A further possible utilization of the pooled counter-EMF energy is to power cooling devices associated with an AC-to-DC power converter that supplies power to the input power bus. The power converter may be cooled by a fan that is at least in part powered by the counter-EMF energy generated by the motors. Additional cooling of the power converter may be by Peltier-type thermoelectric modules that are disposed in heat flow communication with the converter. The modules likewise are interconnected with the counter-EMF bus.

BRIEF DESCRIPTION OF THE DRAWINGS

The details of a typical embodiment of the present invention will be described in connection with the accompanying drawing, which schematically illustrates a plurality of electromechanical actuators receiving input power from a supply bus and transmitting counter-EMF energy to an output bus.

DETAILED DESCRIPTION

The drawing illustrates an electromechanical actuator counter-EMF utilization system 8 constructed according to the best mode of the present invention currently known to applicant and specifically adapted for use on aircraft. The system may be advantageously employed in other situations in which the mode of operation of electromechanical actuators, such as electric motors, requires repeated, very short time period, full-cycle responses in the form of full-speed operation in one direction, rapid braking and deceleration and then full-speed operation in the reverse direction. In aircraft, such cycle responses are needed for the operation of various flight control surfaces, such as spoilers, ailerons, elevators and rudders.

In basic construction, the illustrated electromechanical actuator counter-EMF utilization system 8 includes an AC-to-DC power converter 10 that supplies a fixed level DC voltage to an input power supply bus 12. From bus 12, power is transmitted to a plurality of electromechanical actuators schematically illustrated in the form of three-phase motors 14, 16, 18, and 20. These motors in turn are coupled to a low-voltage counter-EMF bus 22 that distributes the regenerative, counter-EMF produced by the motors during deceleration and braking to various temperature control devices, such as Peltier-type thermoelectric modules 24 and 26 associated with power converter 10 and motor 14, a fuel tank heater 28 and a cooling fan 30 for controlling the temperature of the power converter.

Next, describing the above-identified components with greater specificity, an AC-to-DC power converter 10 is employed to convert wild frequency power produced by a generator, not shown, into a usable, fixed level, DC voltage. Since, in aircraft, the generator is typically coupled to a turbine rotor, not shown, the frequency of the power produced by a generator varies with the turbine speed. Thus, converter 10 is needed to convert the variable frequency power produced by the generator into a usable, constant DC voltage. Converters, such as converters 10, as well known in the art.

Because power converter 10 generates a significant amount of heat, a fan 30 is used to blow air over the converter components to prevent the temperature of the components from exceeding a safe level. The speed of fan 30 is modulated by a temperature controller 32 that senses the temperature of the power converter and adjusts the speed of the fan accordingly.

In accordance with a preferred embodiment of the present invention, power converter 10 is also cooled by a Peltier-type thermoelectric module 24. This module utilizes the Peltier effect wherein if two conductors of different metals are joined together in end-to-end relationship, and then directing a current through the conductors, heat is either absorbed or generated at the junction plane of the two metals depending upon the direction of current flow. If the current flows in one direction, heat is transferred from the power converter to air through the junction plane. Correspondingly, if current is transmitted in the opposite direction, heat would be transferred in the reverse direction. Thus, Peltier-type thermoelectric modules function as electrically powered heat pumps for cooling or heating as desired.

Referring to the drawing, Peltier module 24 is adapted to absorb heat from power converter 10 along the inside surface 33 of the module and correspondingly to generate heat on its exterior surface 34, which heat may be dissipated by fins or any other suitable means, not shown. Thermoelectric module 24 is energized through temperature controller 32 by power from input power supply bus 12 and/or from counter-EMF bus 22, as described more fully below.

As noted above, the electromechanical actuators of the present invention are embodied in the form of motors 14, 16, 18, and 20. As schematically illustrated, motor 14 is constructed with a thermoelectric module 26 and a cooling fan 36, whereas motor 20 relies on heat dissipation through conduction to its gearbox motor housing air fins 37 and other components, not shown. Motors 16 and 18, depicted in block form, may be constructed in the form of motor 14 or motor 20 depending upon the extent that thermal assist is needed to properly cool these motors. Thus, the following description of the construction and operation of motors 14 and 20 is also applicable to motors 16 and 18.

Motor 14 is shown as being in the form of a three-phase type, with its winding 38, 40 and 42, corresponding with phases A, B and C, respectively, connected in a standard "Y" configuration. Preferably, the field of motor 14 is established with permanent magnets, not shown, mounted on a rotor 43 while the windings 38, 40 and 42 are mounted on a stator. Locating the permanent magnets and windings in this manner assists in reducing heat build-up during severe duty cycles involving repeatedly operating the motor for a short time period in one direction, rapidly decelerating the motor and then operating the motor in reverse direction.

Currents in the proper direction and sequence and for the proper time periods are supplied to windings 38, 40 and 42 by an electronic commutator circuit 44. The circuit includes three branches 46, 48 and 50 of switching devices corresponding to windings 38, 40 and 42. Each branch includes switching devices in the form of first power transistors QA1, QB1 and QC1 interconnected between input power bus 12, through a circuit breaker 52 and the first sides 54, 56 and 58 of the three windings. A diode 60 is interposed between the emitters of transistors QA1, QB1 and QC1 and windings 38, 40 and 42 to prevent reverse direction currents from damaging the transistors. Each of the three circuit branches also includes a second switching device in the form of power transistors QA2, QB2 and QC2, respectively, having their collectors interconnected to the first sides 54, 56 and 58 of windings 38, 40 and 42 and their emitters interconnected together to a ground terminal 61. Transistors QA1, QB1, QC1, QA2, QB2, and QC2, hereafter collectively referred to as "motor power transistors", are activated by a control or firing circuit, not shown, having sensors that detect the angular orientation of rotor 43 and then transmit firing signals to the base of the motor power transistor to activate them at the proper time and for the proper duration in a manner known in the art. As is also known in the art, the sequence in which the motor power transistors are fired, and thus the order in which windings 38, 40 and 42 are energized, dictates the rotational direction of the rotor 43.

Although the motor power transistors are illustrated as composed of singular transistors, it is to be understood that they can instead be in the form of individual power modules or circuits. Such modules are commonly available from a number of commercial sources, such as from Collmer Semiconductor, Inc. of Dallas, Tex. (Model No. EVK31-050).

In the operation of commutator circuit 44 to power motor 14, power transistors QA1, QB1, QC1 are sequentially energized for time periods corresponding to 120° of angular rotation of rotor 43, as is common in the electric motor art. The arrows used in conjunction with the commutator circuit 44 and windings 38, 40 and 42 of motor 14 illustrate the direction of current flow during phase B, i.e., when transistor QB1 is activated and winding 40 is conducting. Current from bus 12 is transmitted to circuit 44 through lead 62, across power transistor QB1, which has been activated into conducting state, through diode 60 and through motor winding 40. For one half of the time period that winding 40 is conducting, the current flowing through this winding is routed back through motor winding 38 and then down through lower power transistor QA2 to ground terminal 61 to complete the circuit. During this time, power transistors QA1, QC1, QB2 and QC2 are deactivated into nonconducting state. During the remaining half of the time period in which winding 40 is conducting, transistor QA2 is deactivated and power transistor QC2 is activated so that current flow through winding 38 is terminated and instead the current from winding 40 flows back through winding 42, down through power transistor QC2 and then to ground terminal 61 to complete the circuit. After rotor 43 has rotated through the 120° of phase B, transistor QB1 is deactivated and simultaneously either transistor QA1 or QC1 is activated depending on the direction of rotation of rotor 43. If transistor QA1 is activated, current from bus 12 flows through the transistor, diode 60, down through winding 38, back up through winding 42 during the first half of phase A, through power transistor QC2 and to ground terminal 61 to complete the circuit. Also, transistors QB1, QC1, QA2 and QB2 are deactivated into nonconducting state. During the second half of phase A, power transistor QC2 is deactivated and transistor QB2 is activated to route the current from winding 38 back up through winding 40, power transistor QB2 and to ground to complete the circuit. The current flow through commutator circuit 44 and the motor windings continues in this sequence as long as motor 14 is operated as a motor.

It will appreciated that if the motor power transistors are operated continuously, unduly high current levels would develop in commutator circuit 44 and in the motor windings. To prevent this from occurring, power transistors QA1, QB1 and QC1 are pulse modulated by the firing circuit, not shown, at frequencies typically in the range of 1,000 to 1,200 cycles per second, as is well known in the art.

Although the commutator circuit 44 of motor 14 has been specifically described above, it is to be understood that this description also applies to motors 16, 18 and 20, which motors have similar commutator circuits.

When it is desired to stop motor 14, power transistors QA1, QB1 and QC1 are deactivated into nonconducting condition to isolate the commutator circuit 44 from power supply bus 12. Although power to the motor has been terminated, the inertia of rotor 43 continues to rotate the rotor thereby causing the motor to operate as a generator to induce counter-EMF in motor windings 38, 40 and 42. With shunt connections provided across the windings under these conditions current will flow producing the desired motor deceleration torque. However, such current flow is also usually attended by $I^2R$ heating in the shunt circuits as a conversion of energy to be absorbed in decelerating the motor. Not only is this energy normally wasted but also in equipment increasingly being used in advanced aircraft systems and elsewhere, it creates an energy dissipation problem as previously explained. In accordance with the present invention, the counter-EMF produced by the decelerating rotor is not only diverted by a rectifier circuit 51 so that it does not create an equipment overheating problem, but also is then employed for a useful purpose. To this end, rectifier circuit 51 includes branches 63, 64 and 66 associated with corresponding commutator circuit branches 46, 48 and 50 and corresponding motor windings 38, 40 and 42. Rectifier branch 63 includes a diode 68 interconnected between the first side 54 of winding 38 and a counter-EMF power transistor 70. Rectifier branches 64 and 66 include similar diodes 72 and 74. Rectifier branch 63 also includes a second diode 76 disposed in parallel with power transistor QA2. Similar diodes 78 and 80 are disposed in parallel with power transistors QB2 and QC2.

The operation of rectifier circuit 51 of motor 20 to collect the back EMF energy induced in winding 40, i.e., phase B, will be described with the understanding that the collection of the counter-EMF from windings 38 and 42 occurs in a similar manner and that the commutator circuits of motors 14, 16 and 18 are constructed similarly and operate in a like manner. During the deceleration and braking of motor 20, power transistors QA1, QB1, QC1, QA2, QB2 and QC2 are rendered nonconducting while EMF power transistor 70 is activated into conducting state. During one half of phase B, the induced current produced in winding 40 flows through diode 72 of rectifier branch 64, through power transistor 70 and to bus 22. From the bus, the current may be routed to any of various possible temperature control devices, such as the thermoelectric module 26 of motor 14 or the temperature controller 32 of power converter 10 and then to ground terminal 61. From the ground terminal of circuit 44, current flows through diode 76 of rectifier branch 63, through winding 38 and back to winding 40 to complete the circuit. During the other half of phase B, current flows from ground terminal 61, through diode 80 of rectifier branch 66, through winding 42 and back to winding 40 to complete the circuit.

The rating of EMF power transistor 70 can be selected to accommodate all of the counter-EMF current produced by windings 38, 40 and 42. Alternatively, the current flowing through the power transistor can be reduced or controlled so that a smaller transistor may be used. During phase B, the current level through transistor 70 is limited by intermittently triggering power transistor QB2 (as shown by the broken line arrow) to reroute part of the induced current directly back through windings 38 and 42, and then through windings 40 to dissipate a small portion of the counter-EMF energy. However, dissipating the current induced in winding 40 in this manner reduces the level of counter-EMF energy transmitted to bus 22.

It will be appreciated that through the use of rectifier circuit 51 of the present invention, the counter-EMF produced by windings 38, 40 and 42 is isolated from power supply bus 12. This prevents that counter-EMF from inducing undesirable transients in the power supply that may disrupt the proper operation of other electrical components or devices connected to the power bus. Moreover, by isolating the counter-EMF energy collected by circuit 51 from the power bus, substantially all of the counter-EMF energy may be utilized. If, on the other hand, the counter-EMF energy current were routed through the power bus 22 back to the power supply, a special high-voltage sensing power converter must be installed on the bus to isolate the counter-EMF energy. Also, power transistors QA2, QB2 and QC2 must be triggered frequently to dissipate more of the counter-EMF energy through windings 38, 40 and 42 causing increased heat buildup in the winding.

As noted above, according to the present invention, a plurality of electromechanical actuators in the form of motors, 14, 16, 18 and 20 are connected to a common bus 22 to "pool" the counter-EMF energy produced by the motors for use as a common power source for temperature control devices associated with the motors themselves or for other temperature control needs remote from the motors. For instance, bus 22 is interconnected with temperature controller 32 of power converter 10 by line 82 to provide auxiliary power for fan 30 and thermoelectric module 34. Power line 82 is connected in parallel with primary power line 84 that interconnects temperature controller 32 with power bus 12 through fuse 86. Power converter 10 in a typical application, such as in an aircraft, provides power for other needs in addition to operating motors 14, 16, 18 and 20. As a consequence, the power requirements of fan 30 and thermoelectric module 34 most likely would be in excess of the counter-EMF energy produced by these motors. Nevertheless, these temperature control devices could serve to absorb the excess counter-EMF energy not utilized by other temperature control devices interconnected with bus 22.

Bus 22 is also interconnected with heating coils 88 of heater 28 used to warm the fuel within a tank 90. Fuel for jet aircraft engines and other power plants is commonly heated to increase the energy content of the fuel. A temperature control switch, not shown, may be interposed between coils 88 and bus 22 to control the flow of current to coils 88 to ensure that the temperature of the fuel is maintained within safe limits.

The deceleration energy produced by motors 14, 16 and 18 may be employed to power thermoelectric modules 26 associated with the motors themselves. As illustrated with respect to motor 14, thermoelectric modules 26 are disposed in heat flow communication with the components of commutator circuit 44 to transmit the heat produced by these components to a plurality of fins 92 mounted on a base 94 interposed between the fins and the modules. A temperature control device 96 is interposed between power transistor 70 and modules 26 to regulate the operation of modules 26 in response to the level of heat produced by circuit 44. Fins 92 are housed within a shroud 97 and may be cooled by air circulated through the shroud by motor fan 36 or by natural convection. The quantity of heat transmitted from the fins to the passing air is not so great as to warm the air enough to significantly reduce its effectiveness in cooling the components of motor 14. If the power needs of thermoelectric modules 26 are less than the level of power produced by decelerating motor 14 now acting as a generator, the excess is routed to bus 22 for other uses. Correspondingly, if the power needs of thermoelectric modules 26 are not fulfilled by generator action of the decelerating motor, additional power can be obtained from other counter-EMF sources tied to bus 22 and the existing power supply system.

It will be appreciated that by the present invention, deceleration energy generated by electromechanical actuators, such as electric motors 14, 16, 18 and 20, is immediately isolated from the DC power input and employed for useful purposes, i.e., to power temperature devices to cool the motors themselves, rather than being wasted. Also, the level of counter-EMF energy regenerated by the motors is proportional to the cooling requirements of the motors. The level of heat produced, for instance, by motor 14 and circuit 44, is related to the severity of the duty cycle of the motor, i.e., the frequency with which the motor is operated in one direction, decelerated and stopped and then operated in the reverse direction. The counter-EMF energy is collected from the motor during the time period that it is decelerating, which is also the time period in which the greatest amount of energy is being generated by the motor. Thus, peak availability of counter-EMF energy to power cooling devices is available when most needed.

As will be apparent to those skilled in the art to which the invention is addressed, the present invention may be embodied in forms other than those specifically disclosed above without departing from the spirit or essential characteristics of the invention. The particular embodiment of the electromechanical actuator counter-EMF utilization system 8, described above, is therefore to be considered in all respects illustrative and nonrestrictive. The scope of the present invention is as set forth in the appended claims rather than being limited to the example of system 8 set forth in the foregoing description.

The embodiments of the invention in which an exclusive property or privilege is claimed are defined as follows:

1. An improved electric motor for use with a plurality of additional loads apart from the motor, said improved motor having a power supply system and comprising:
   a. a plurality of electromagnetic windings;
   b. commutator circuit means operably coupled between said electromagnetic windings and the power supply system;

c. means for controlling said commutator circuit for energization of said electromagnetic windings to operate the motor as a motor and for terminating such energization of said electromagnetic windings to permit deceleration of the motor whereby the motor operates as a generator;

d. rectifier means separate from said commutator circuit means and connected to said electromagnetic windings to divert from said commutator circuit means the counter-EMF energy generated by the motor during deceleration and to simultaneously collect the counter-EMF energy generated by the motor during deceleration, said rectifier circuit means including EMF power switching means; and, e. wherein said control means:

isolating said electromagnetic windings from said commutator circuit means and the power supply system during deceleration of the motor and simultaneously closing said EMF power switch means to prevent transmission of the counter-EMF energy produced by the motor during deceleration through said EMF power switching means; and, interconnecting said electromagnetic windings with said commutator circuit means and the power supply system and simultaneously opening said EMF power switching means when the motor is being operated as a motor.

2. The improvement according to claim 1, wherein: said rectifier circuit means comprises:

a first rectifier means operably coupled between the first side of each electromagnetic winding and said EMF power switching means to permit electrical power to flow from said electromagnetic windings to said EMF power switching means; and, second rectifier means operably coupled between the first side of each electromagnetic winding and ground to permit electrical power to flow from ground to said electromagnetic windings; and, the second sides of said electromagnetic windings being interconnected together.

3. The improvement according to claim 1, further comprising means for cooling the electric motor, said cooling means operably interconnected to said rectifier circuit means for utilizing the counter-EMF energy generated by the electric motor to operate said cooling means.

4. The improvement according to claim 3, wherein said cooling means includes: thermoelectric module means disposed in heat flow communication with commutator circuit means and/or said rectifier circuit means; and temperature control means disposed between said thermoelectric module means and said EMF power switching means for selected activation of said thermoelectric module means in response to the cooling needs of said commutator circuit means and/or rectifier circuit means.

5. The improvement according to claim 1:

further comprising an electrical power converter for producing a regulated supply power to the electric motor; and, wherein the additional loads include:

means for cooling said electrical power converter;

temperature controller means for controlling the activation and deactivation of said electrical power converter cooling means; and, means for interconnecting said power converter cooling means and said temperature controller means with said rectifier circuit means to provide auxiliary power for operating said electrical power converter cooling means.

6. The improvement according to claim 5, wherein said power converter cooling means includes thermoelectric module means disposed in heat flow communication with said electrical power converter.

7. The improvement according to claim 1:

wherein the additional loads include at least one additional electric motor, each of said additional electric motors being powered by the power supply system through its own rectifier circuit means; and, further comprising EMF bus means connected to said rectifier circuit means of the electric motor and each of said additional electric motors for collecting the counter-EMF power produced thereby.

8. The improvement according to claim 7, further comprising means for cooling at least one of said electric motors; and means for interconnecting said electric motor cooling means with said counter-EMF bus to power said electric motor cooling means with the counter-EMF electrical energy produced by the electric motor and each of said additional electric motors.

9. The improvement according to claim 1, wherein:

a. the motor includes a rotor and stator;

b. said commutator circuit means includes:

first switching means operably coupled to the first side of each electromagnetic winding and connectable to the power supply system to route electrical power from said power supply system to said electromagnetic windings;

second switching means operably coupled between the first side of each electromagnetic winding and ground to route electrical power from ground to said electromagnetic windings;

c. the second sides of said electromagnetic windings are connected together;

d. said control means including means for alternatively:

activating the first switching means of one of said electromagnetic windings and the second switching means of another of said electromagnetic windings while deactivating all of the remaining first and second switching means of all of the remaining electromagnetic windings in response to the relative orientation of said rotor and stator, thereby to operate the motor as a motor; or, deactivating said first and second switching means of all of said electromagnetic windings to disconnect said electromagnetic windings from the power supply system to permit deceleration of the motor whereby it operates as a generator;

e. said rectifier circuit means includes:

first rectifier means operably coupled between the first side of each electromagnetic winding and said EMF power switching means, said first rectifier means biased to permit electrical power to flow from said electromagnetic windings to said EMF power switching means; and, second rectifier means operably coupled between the first side of each electromagnetic winding and ground, said second rectifier means biased to permit electrical power to flow from ground to said electromagnetic windings; and, f. wherein said control means closing said EMF power switching means when said first and second switching means of each electromagnetic winding are all deactivated to permit transmission of the counter-EMF generated by the motor acting as a generator through said EMF power switching means, and opening said EMF power switching means when any of said first and second switching means of any of said electromagnetic windings is closed during the operation of the motor as a motor.

10. A regenerative system for utilizing the counter-EMF energy produced by an electromechanical actuator acting as a generator during deceleration of the actuator for cooling the actuator, the actuator having a magnetic field associated with either the rotor or stator of the actuator and a plurality of electromagnetic windings associated with the other of the rotor or stator and connectable to an actuator input power supply system, said regenerative system comprising:

commutator circuit means operably coupled between said electromagnetic windings and the power supply system for energizing said electromagnetic windings to operate the actuator as a motor, and terminating such energization of the electromagnetic windings to permit deceleration of the actuator whereby it operates as a generator;

cooling means disposed in heat flow communication with the actuator; and rectifier circuit means distinct from said commutator circuit means for diverting from said commutator circuit means the counter-EMF energy generated by the actuator during deceleration and simultaneously transmitting the counter-EMF electrical energy to said cooling means to power said cooling means.

11. The regenerative system according to claim 10, wherein said commutator circuit means includes:

switching means operably coupled to the actuator winding and connectable to the input power supply system; and control means for selected activation of said switching means based on the relative positions of the windings and the magnetic field for energization of the windings when the actuator is being operated as a motor and for terminating such energization of the motor windings from the input power supply when the actuator is being used as a generator.

12. The system according to claim 11, wherein:

a. said switching means includes:
first switching means operably coupled between a first side of each of the electromagnetic windings and connectable to the power supply system to route electrical power from the power supply system to the electromagnetic windings; and,
second switching means operably coupled between the first side of each electromagnetic winding and ground to route electrical power from ground to the electromagnetic windings;

b. the second side of said electromagnetic windings being connected together; and, c. said control means including means alternatively for:
actuating a first switching means on a first electromagnetic winding and actuating a second switching means on one of the other electromagnetic windings while deactivating all of the remaining first and second switching means of all of the remaining electromagnetic windings in response to the relative orientation of the rotor and stator thereby to operate the actuator as a motor; or,
deactivating said first and second switching means of all the electromagnetic windings to disconnect the electromagnetic windings from the power supply to permit deceleration of the actuator whereby it operates as a generator.

13. The system according to claim 12, wherein:

a. said rectifier circuit means comprises:
EMF power switching means;
first rectifier means operably coupled between the first side of each of the electromagnetic windings and said EMF power switching means to permit electrical power to flow from the electromagnetic windings to said EMF power switching means; and
second rectifier means operably coupled between the first side of each electromagnetic winding and ground to permit electrical power to flow from ground to the electromagnetic windings; and b. said control means closing said EMF power switching means when all of said first and second switching means for all of the electromagnetic windings are deactivated thereby to permit transmission of counter-EMF energy generated by the actuator acting as a generator through said EMF power switching means, and opening said EMF power switching means when any one of said first or second switching means of any of the electromagnetic windings is closed during the operation of the actuator as a motor.

14. The regenerative system according to claim 10, further comprising:
electrical power converter means for producing regulated input supply power to the actuator;
means for cooling said electrical power converter means; and
means for interconnecting said electrical power converter cooling means with said rectifier circuit means to provide auxiliary power for operating said electrical power converter cooling means.

15. The regenerative system according to claim 14, wherein said electrical power converter cooling means includes thermoelectric modules disposed in heat flow communication with said converter.

16. The regenerative system according to claim 10, further comprising:
a plurality of electromechanical actuators having individual commutator circuit means and rectifier circuit means; and
an EMF bus connected to said rectifier circuit means of each actuator for collecting the counter-EMF power produced by said actuators.

* * * * *